March 19, 1963     J. C. GEVAS     3,081,637
ACCELEROMETER AND DIGITAL TRANSMISSION MEANS
Filed Feb. 17, 1960     3 Sheets-Sheet 1

JAMES C. GEVAS
INVENTOR.

BY Andrew L. Bain
ATTORNEYS

March 19, 1963   J. C. GEVAS   3,081,637
ACCELEROMETER AND DIGITAL TRANSMISSION MEANS
Filed Feb. 17, 1960   3 Sheets-Sheet 2

JAMES C. GEVAS
INVENTOR.

BY Andrew L. Bain
Sidney G. Faber
ATTORNEYS

March 19, 1963   J. C. GEVAS   3,081,637
ACCELEROMETER AND DIGITAL TRANSMISSION MEANS
Filed Feb. 17, 1960   3 Sheets-Sheet 3

JAMES C. GEVAS
INVENTOR.

BY Andrew L. Bain
Sidney G. Faber
ATTORNEYS

United States Patent Office 3,081,637
Patented Mar. 19, 1963

3,081,637
ACCELEROMETER AND DIGITAL TRANSMISSION MEANS
James C. Gevas, Newark, N.J., assignor to General Precision, Inc., Little Falls, N.J., a corporation of Delaware
Filed Feb. 17, 1960, Ser. No. 9,286
10 Claims. (Cl. 73—517)

This invention relates generally to improvements in accelerometers and more particularly to improved accelerometers of the digitally operating variety for determining the accelerator and velocity of a rapidly movable body with extreme accuracy and sensitivity and producing digitalized signals representing these measurements.

The invention is particularly concerned with the accurate measurement of these inertial quantities in high speed aircraft and missiles applications, and it is accordingly a primary object of the invention to provide such an accelerometer of small volume, light weight and minimized complexity.

With the progressively increasing speeds and maneuverabilities of air and space craft, the need for more accurately measuring rapidly changing accelerations during the short time periods involved has become essential to properly stabilize and navigate such craft without large errors. To meet these more demanding needs, there has been evolved a class of accelerometers of the digitally operating variety wherein very small movements of an acceleration responsive flywheel or pendulum are detected by high speed pulse operating means in such manner that the sum or other calculated quantity of the pulses accurately provides the inertial information desired.

However, previously known accelerometers of this type are complex and neither as small nor lightweight as is desired for aircraft and related uses. Furthermore, many of such accelerometers are of the integration varieties yielding a basic output signal proportional to velocity rather than acceleration, and are accordingly subject to error in the differentiation process of obtaining the acceleration signal. In addition, many known digital accelerometers are very limited in the time-rate-of-acceleration which they can transduce with stability and accuracy.

To overcome these disadvantages according to the present invention there is provided a lightweight and highly sensitive accelerometer of the pendulum type that is controlled by a high speed pulse control circuit in such manner that the pendulum is rapidly balanced by a force equal and opposite to the acceleration force. This balancing force is produced in response to operation of a digital pulse system functioning at a speed many times greater than the occurrence of the changes in acceleration to which the pendulum is subjected whereby the restoring or balancing force may be varied with great rapidity. Since the balancing force equals the acceleration and is generated in response to digital pulses, the acceleration may be measured directly and with great accuracy by differentially summing the pulses.

The pulse operating control circuit for the pendulum of the present invention embodies a number of singularly novel features for reducing the size and complexity of the system without sacrificing either its sensitivity, accuracy, or stability. Among others, there is provided what may be generally termed a memory device for recalling the acceleration the instant of the last measurement. This memory enables the succeeding rapid changes in acceleration of the craft to be measured incrementally, or in steps, whereby the system need detect only the changes in acceleration occurring during each extremely short time interval. By detecting only the incremental variations in acceleration, the system is not only greatly simplified, but its dynamic range of acceleration measurement may be extended considerably over known devices.

Another of these novel features resides in the manner of stabilizing this extremely sensitive system which would otherwise react quite violently and uncontrollably in response to vibration and other undesired transient movements. This stabilization is generally performed by introducing added impulses of energy into the digital restoring force system in addition to the acceleration balancing force, whereby the ultimate restoring force operating upon the inertia responsive element is made to anticipate further accelerations in a predetermined controlled manner thereby to avoid or compensate for hunting or undesired oscillations. This technique of instability compensation is in marked contrast to and avoids many of the difficulties associated with "lead' or differentiation control correction of servo systems thereby providing a further improvement over known digital accelerometer systems.

It is accordingly a primary object of the invention to provide an accelerometer capable of accurately detecting extremely fast variations in movement of a body, and over a wide range of such movements.

A further object is to provide such a device of small volume, light weight, and reduced complexity.

A still further object is to provide such a device that is highly sensitive to such movement yet stable and substantially unaffected by undesired transients.

Another object is to provide an incrementally operating digital accelerometer having anticipatory stabilization control.

Other objects and many additional advantages will be more readily understood by those skilled in the art after a detailed consideration of the following specification taken with the accompanying drawings wherein.

Figure 1:
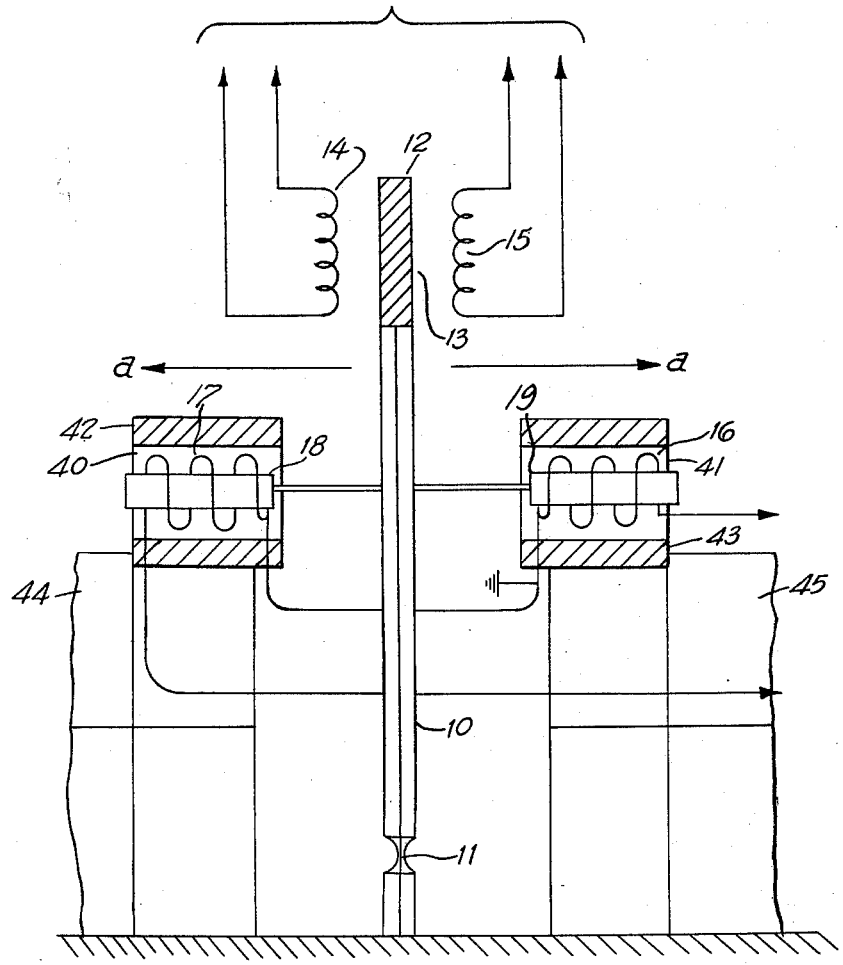
FIGURE 1 is a diagrammatic representation of an acceleration sensitive component that may be employed in a preferred embodiment of the invention.

Referring now to the drawings, there is diagramatically shown in FIGURE 1 an acceleration responsive element that may be employed according to the present invention. This preferred accelerometer element is fully disclosed in detail in a copending application of William J. Lewis et al., Serial No. 742,316, filed on the 16th day of June, 1958, now Patent No. 2,985,021, and assigned to the same assignee as the present invention, accordingly for purposes of the present invention only a schematic showing and description thereof is believed necessary. As shown, the acceleration responsive element may be in the form of an inverted pendulum comprised for an elongated upright arm 10 pivotally supported at its base by a flexure 11 or other pivot of a suitable nature and accordingly free to tilt in opposite directions in one plane along axis $a$—$a$ in response to accelerations along this axis.

Positioned at the upper or free end of the pendulum arm 10, there is provided a pickoff means generally designated 12 and comprised of an energized transmitter magnetic coil 13, fastened to the upper end of pendulum arm 10 and a pair of receiver coil 14 and 15, independently supported on opposite sides of magnetic coil 13 and normally spaced equidistantly from coil 13 along the acceleration responsive axis $a$—$a$. With such an arrangement, when the pendulum arm 10 assumes a normally vertical position and equally spaced from both coils 14 and 15, equal amplitude signals are induced in each coil 14, 15 indicating that the pendulum is in a neutral or vertical position. However, when the free end of the pendulum arm 10 is tilted about flexure 11 in either direction along axis a—a in response to an acceleration, the transmitter coil 13 is positioned closer toward one receiver coil and correspondingly further from the other, whereupon one receiver coil produces a greater signal, and the other a lesser signal thereby indicating the degree of deflection of the pendulum and the direction thereof along axis a—a.

To restore the pendulum arm 10 to its normally centered vertical position, there is provided a pair of torque coils 16 and 17, fixedly attached to opposite sides of the pendulum arm 10 in the direction of axis a—a. Torque coil 16 and 17 are normally centered in the air gaps 40 and 41 respectively provided in the pole pieces of 42 and 43 of permanent magnets 44 and 45. Depending upon the polarity of the current in coils 18 and 19, a torque results in such a direction as to restore the pendulum to its vertical neutral position. As will be discussed more fully hereinafter, the torque coils 16 and 18 are adapted to be variably energized with a direction-sensitive current proportional to the acceleration experienced by the pendulum arm 10, and consequently the restoring force is continuously adjusted to be of a magnitude equal and opposite to the acceleration.

According to the present invention, there is provided an extremely sensitive and accurate digitally operating system responsive to tilting of the pendulum arm 10 about its flexure pivot 11 to rapidly energize the torque coils 16 and 17 to oppose such movement and always maintain the pendulum arm 10 in substantially its centered vertical position. More specifically, upon deflection of the pendulum arm 10, a digital operating system receives energizing signals from pickoff coils 14 and 15 and in response thereto generates a current through torque coils 16 and 17 to rapidly restore the pendulum arm to its centered position. Since the pickoff coils 14 and 15 and the torque coil windings 16 and 17 are both operating in the analog system, it is evident that the digital control system must first convert the analog pickoff signals into digital form and later reconvert the digital output back into current to energize torque coils 16 and 17.

Figure 2:
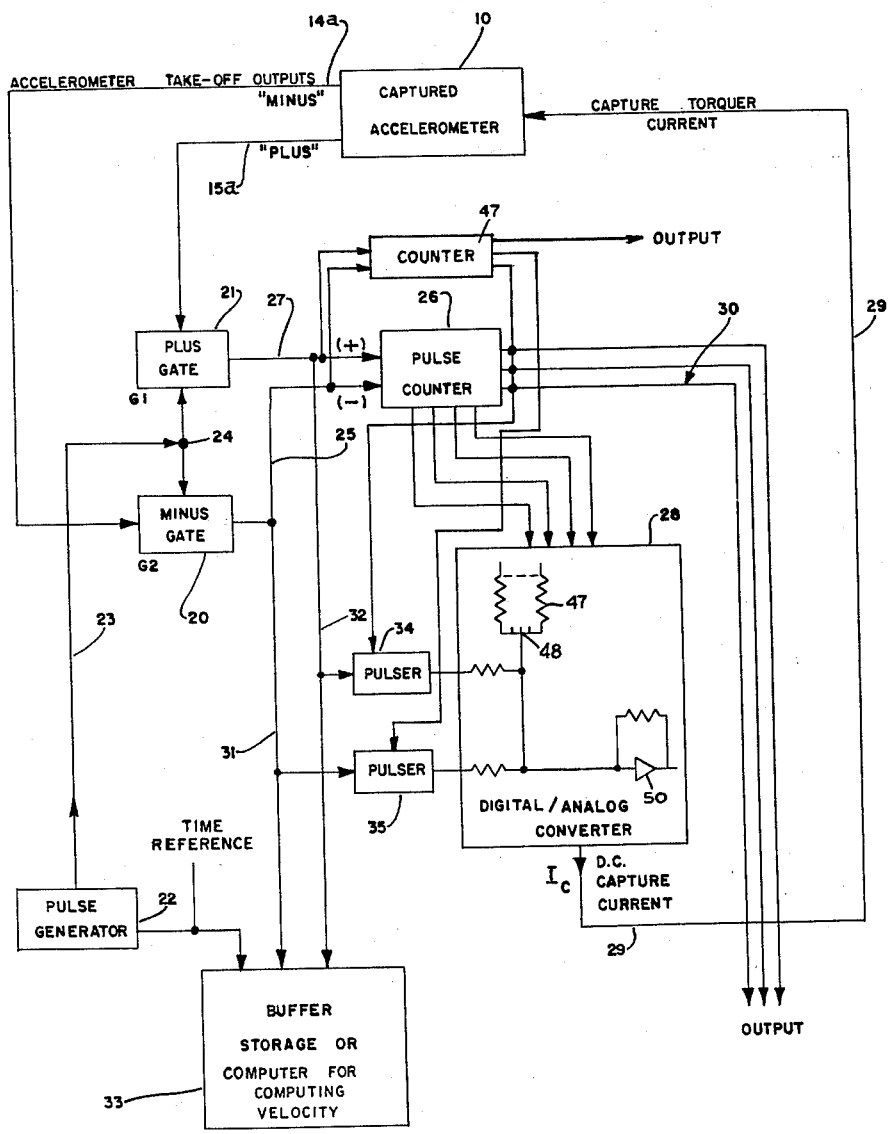
FIGURE 2 is a block diagram schematically representing the digital control and operating system therefor.

Referring now to FIGURE 2 for an understanding of this preferred digital control system, a "minus" accelerometer pickoff signal from the pickoff coils 14 and 15 is transmitted over line 14a to a gate circuit 20, whereas a "plus" is transmitted over line 15a to a gate circuit 21. Gates 20 and 21 respond to the pickoff signals exceeding a given amplitude to open, but do not respond to the lower amplitude signals being produced when the accelerometer arm is centered between the pickoff coils 14 and 15 or is displaced with the opposite polarity. Thus if the accelerometer arm 10 is tilted to the left toward coil 14, for example, the gate circuit 20 is opened and gate 21 remains closed, and if the accelerometer arm 10 is tilted toward coil 15 the opposite gate circuit 21 is opened, but gate 20 remains closed.

Upon gate circuit 20 being opened in response to the accelerometer pickoff signal, electrical pulses being generated by pulse generator 22 and passing upwardly over line 23 to junction 24, are permitted to pass through gate circuit 20 and over line 25 leading to a reversible counter 26. Similarly upon gate circuit 21 being opened, the pulses for generator 22 pass through gate circuit 21 to a second input line 27 leading into pulse counter 26. Pulse counter 26 is preferably a reversible counter of the high speed electronic variety as is well known in the art and functions to accumulate the pulses received over each line in opposite directions. That is, the pulses received over the line 27 are accumulated in one direction to yield a sum thereof that may be represented in a binary numbers code and the pulses received over line 25 are accumulated in the opposite direction. Consequently, when pulses are received over both lines (at different times) in response to the accelerometer tilting both to the left and right, the counter 26 provides an accumulated number proportional to the difference between the sum of the pulses received over lines 25 and 27.

To complete the follow-up acceleration measuring system, the output of pulse counter 26 is then directed to a digital to analog converter 28, hereafter described in greater detail, which converter performs the function of converting the resulting number accumulated in the counter 26 into an analog current of the corresponding magnitude and polarity over line 29, and this current is directed backwardly to energize the torque coils 16 and 17 in such a manner as to continuously restore the pendulum arm 10 to its upright normally centered position equidistantly between the pickoff windings 14 and 15. Since the restoring torque being generated by torque coils 16 and 17 is equal and opposite to the accelerational torque acting on pendulum 10, and since the torque generated by torque coils 16 and 17 is directly proportional to the current over line 29, it is evident that the current over line 29 is proportional to the acceleration and that the digital number accumulated in the counter 26 is also proportional to the acceleration. Thus the counter 26 operates at a memory to recall all of the incremental accelertaion steps and at any given time instant provides a digital number representation of the accelerational force and torque acting upon the pendulum arm 10.

Recapitulating, the sequence of operations as thus far described, the pendulum arm 10 operates, generally speaking, as a rapidly movable on-off device that responds to each incremental change in acceleration to tilt toward one or the other of its pickoff windings 14 and 15. Upon tilting, the pickoff windings 14 or 15 provide a signal to open one or the other gate circuits 20 or 21 enabling pulses from the high speed pulse generator 22 to pass therethrough and to add to or subtract from the count accumulated in the reversible counter 26. The count previously standing in the reversible counter 26 represents the acceleration just prior to the acceleration change thereof, whereby the incremental pulses added to the counter 26 changes the digital number therein by adding or subtracting an increment to conform with the change in acceleration. Considering a simplified example of this operation to more easily comprehend this mode of operation, let it be assumed that the accelerometer arm 10 is experiencing an acceleration of 10 units for a given period of time. The accumulated count standing in the reversible counter 26 is also 10 units and this count is translated into an analog current over line 29 by digital to analog converter 28. The analog current is directed backwardly over line 29 to energize torque windings 16 and 17 to counterbalance or nullify the acceleration operating on pendulum arm 10 to center the pendulum arm equally between the pickoff coils 14 and 15. So long as this acceleration of 10 units remains constant, pickoff coils 14 and 15 do not produce a signal large enough to open either gate circuit 20 or 21 and the system remains at balance. Thereafter, assuming that the acceleration acting upon the pendulum increases to 11 units, the added acceleration increment of 1 unit is momentarily not balanced by the torque coils 16 and 17. Consequently, the pendulum arm 10 is tilted toward pickoff coil 15, and a signal therefrom opens gate circuit 21 to permit a pulse from pulse generator 22 to pass therethrough and be added in the reversible counter 26 changing its count from 10 to 11 units. This increased digital count is thence converted into an increased analog current over line 29 by the action of the digital to analog converter 28 thereby to increase the energization of torque coils 16 and 17 as to again counterbalance the acceleration and restore the pendulum arm 10 to its nominal vertical upright posiiton. As the pendulum arm 10 is restored, the gate 21 is again closed and the reversible counter 26 remains at count 11 until the next incremental change in acceleration. In the meanwhile, of course, the digital to analog converter 28 continues to produce a restoring current over line 29 to the torque coils 16, 17 to maintain the pendulum arm 10 centered and balanced against the acceleration of 11 units.

Continuing with a second example, let it be assumed that the acceleration decreases from 10 to 9 units. In this case, the pendulum is tilted in the opposite direction by the negative increment or opposite change of acceleration, thereby opening gate circuit 20 and permitting the pulse generator 22 to pass a pulse therethrough over line 25 to the counter 26. This pulse operates the counter 26 in the opposite direction, changing its count from 10 to 9 units to conform with the decrease in acceleration. Again this digital count is translated in the converter 28, into an equivalent analog current over line 29, reducing the energization of the torque coils 16 and 17 to restore the pendulum arm to its center or substantially vertical position.

Thus according to the present invention, there is provided an incrementally operating digital follow-up system for directly measuring the acceleration with great accuracy and sensitivity. Furthermore, since the pulse generator 22 may preferably operate at a frequency in the range of 200,000 c.p.s. or 200 kc., that is well within the capicity of available electronic counters 26, gate circuits 20 and 21 and other components, it is evident that the torque balancing forces may be varied at microsecond intervals to compensate for the most rapid changes in acceleration.

Returning to FIGURE 2 for an understanding of further features of the invention, there is additionally provided means for continuously obtaining the measured acceleration in digital form, means for continuously obtaining the velocity, and means for stabilizing the system against undesired transients.

The means for obtaining the accelerometer output in digital form need comprise nothing more than the output lines 30 connecting to the various stages of the counter 26, since the counter 26 is continuously varied in increments with changes in the acceleration and consequently "remembers" the acceleration. It is also contemplated according to the present invention, that the count standing in counter 26 will be periodically scanned and the results transmitted to a computer (not shown) for further computation as may be necessary for navigation or control purposes. During such brief scanning periods, it is necessary that the count stored in the counter 26 not be changed. However, at the same time it may be necessary that the follow-up restoring torque system continue to operate as described above in response to incremental changes in the acceleration acting upon pendulum arm 10. To perform this function, there may be provided a buffer counter (not shown) comprised of one or two counting stages connected in parallel with counter 26. This buffer responds to the output of gate circuits 20 and 21 only during the scanning of counter 26 and during this scanning period transfers the received count, if any, to the analog to digital converter 28. At the end of the scanning period, the count contained in the buffer counter is also added to the count recorded in counter 26 to correct its reading as required.

Figure 3:
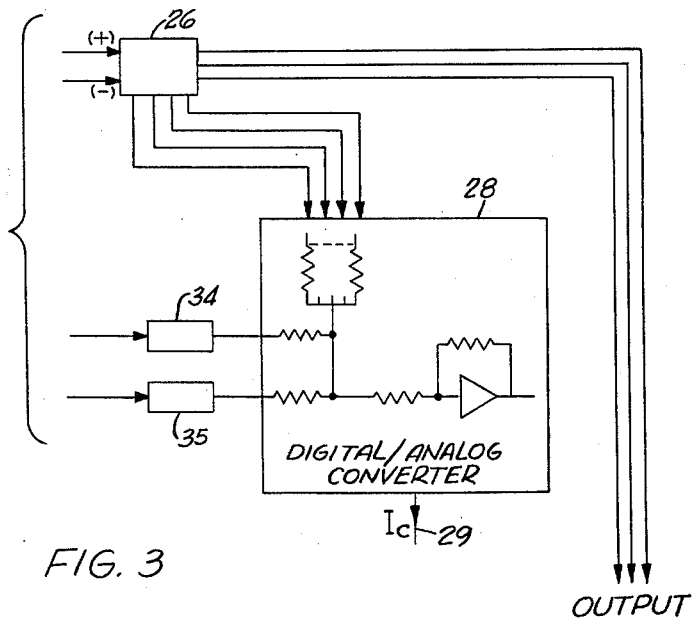
FIGURE 3 is an electrical schematic diagram illustrating details of a preferred digital to analog converter employed in the system shown in FIGURE 2, and FIGURE 4 schematically illustrates the waveform of the pulses produced by the pulser devices 34 and 35 of FIGURE 2.

The analog to digital converter 28 may be a conventional Kirchoff type current adder, as shown in FIGURE 3. Each stage of a binary pulse counter 26 is connected to a different summing resistor 47 which, in turn, are all connected at a common junction point 48 leading to the input of a summing amplifier 50. As the counter 26 receives pulses, each stage transmits either zero or its respective weighted current through its associated resistor 47 and into the accurate summing amplifier 50. The pulse counter switches either zero or a weighted current from each stage, depending upon whether the subject stage is in the "zero" or the "one" state. The switching may be accomplished with conventional solid-state electronic switches. The output of said summing amplifier is then an analog current over line 29 proportional to the digital count in the pulse counter 26.

For the purpose of obtaining a measurement of the velocity with greatly reduced quantization errors, each of the incremental acceleration correcting pulses being transmitted through gates 20 and 21 are also directed downwardly over lines 31 and 32, respectively, to buffer storage stages (not shown) or to the storage portion of a computer, generally designated 33. This storage means may, for example, comprise a rotating drum register as well known in the art. The time at which each such pulse is transmitted may be determined by comparison with the standard pulses being produced by pulse generator 22, and the acceleration is known from counter 26. Consequently, since the incremental velocity change equals the product of time and acceleration, the velocity change may readily be computed.

One of the most important of the features of the present invention is the means for stabilizing the system of FIGURE 2 against oscillation due to the pendulum time constant and to undesired transients, such as those resulting from vibration. Since the system is extremely sensitive to even the slightest incremental change in acceleration, it is evident that it may respond to short duration transients, such as vibration, to become violently unstable, hunting back and forth without control. Further, the pulse counter 26 acts as an integrator, so that coupled with the pendulum time constant, oscillations can occur. To prevent this action from occurring, there is provided means for introducing transitory impulses into the follow-up system in a manner that might be in small measure likened in function to a lead or anticipatory compensation.

Referring again to FIGURE 2, there is diagrammatically shown two transient pulse producing circuits, 34 and 35, with the circuit 34 being responsive to each impulse transmitted through gate 21 and over lines 27 and 32, to introduce a fixed duration pulse into the converter 28, and with the circuit 35 being responsive to each impulse from gate 20 and over line 31 to introduce a fixed duration pulse into converter 28. The function of pulse producers 34 and 35 is to introduce a large transient increment of current over line 29 to the torque coils 16 and 17 whenever the counter 26 changes by one increment. The magnitude of the pulses being generated by circuits 34 and 35 is adjustable, but usually made much greater than the effect being produced by a lowest-bit-increment of change of the counter 26. These pulses may, therefore, be likened to an anticipatory or lead impulses which when added in the digital-analog converter 28 from counter 26, serve to more rapidly change the current over line 29 energizing the torque coils 16 and 17 to rapidly balance the pendulum arm. Thus, by the introduction of the correcting pulses from pulse producing circuits 34 and 35, the pendulum arm 10 is restored to its vertical more quickly or in an anticipating manner than if the pulse producing circuits 34 and 35 were not present. On the other hand, these correcting pulses do not result in overshoot of the pendulum arm 10 toward its opposite pickoff winding since the follow-up system is inherently lagging behind the acceleration applied to the pendulum arm 10. In other words, the system normally experiences a very short delay when subjected to an acceleration, until the pendulum arm 10 is tilted to energize its pickoff coils 14 and 15 and open one or the other of gates 20 or 21. For this reason, an incremental change in the torque balancing current over line 29 must necessarily slightly lag the acceleration producing this change. However, the addition of transient pulses from pulse producing circuits 34 and 35 introduces an increased change in current over line 29 to enable the system to "catch up" or synchronize with the change of acceleration. Accordingly the compensation control, as described above is generally analogous in result to a lead or anticipatory network. However, the compensation signal is not proportional to the derivative of the error signal, as is common in the usual servo system, but rather to its magnitude. As a result, this compensation can be more easily controlled to provide a wide range of operation without the usual problems associated with rate compensation.

Figure 4:
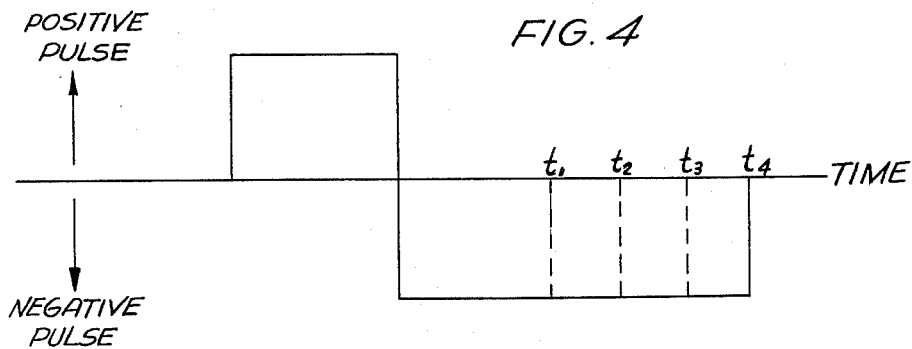

The pulses being produced by pulse producing circuits 34 and 35 have two portions, a "positive" going portion followed by a "negative" portion, as shown in FIGURE 4. The positive portion functions to drive the pendulum towards its null position, and the negative portion, occurring at a time slightly afterward, functions to electrically brake the pendulum rotor, adjusting its kinetic energy to such a value at the end of the pulse period that stable dynamic operation results.

The varying relative areas of the positive and negative portions of these transient pulses allows the pendulum to follow rates of change of incident acceleration far in excess of what would be possible previously, for a given pendulum-rotor time constant. For a given "uncaptured" acceleration, which for satisfactory accelerometer operation cannot exceed one bit in the lowest order of counter 26, it would take a finite, fixed time for the rotor to pass through its threshold error angle, signalling the opening of gate circuit 20 or 21, and the incrementing of counter 26. This time sets an upper limit to the rate of change of incident acceleration allowable for satisfactory operations. By making the negative portion of the transient pulse larger in area than the positive pulse, the rotor at the end of a pulse period is given a net velocity away from null and in the direction of the incident acceleration. Thus, the pendulum will trigger the next incremental addition to the contents of counter 26 much sooner than its time constant would normally allow. This in turn, makes possible the accurate transducing of rates of acceleration far greater than heretofore possible, since the counter 26 can now be incremented almost as fast as the incident acceleration increases.

The pulse producing circuits may preferably be made adjustable to vary the relative energies in the positive and negative going portions of the pulses for the purpose of accurately controlling the device over wide ranges of rate-of-change of acceleration. Specifically, the pulse producing circuits 34 and 35 may be made adjustable to produce the wave-form shown in FIGURE 4 having a negative portion that terminates at either $t_1$, $t_2$, $t_3$, or $t_4$. If the negative going portion is terminated at $t_1$, for example, the negative braking and net force return of the pendulum is made smaller to respond to slower rates-of-change of acceleration, whereas if the negative going portion is terminated at $t_4$, the system responds to faster rates-of-change of acceleration.

For automatically controlling the pulse producing circuits 34 and 35 to respond in this manner, the incremental change in counter 26 over a fixed time interval may be sampled by means of an additional counter 47, as shown in FIGURE 2, that is triggered on and off periodically. During each on period this counter 47 records the number of incremental changes in counter 26, indicating the rate-of-change in acceleration during that period. If this rate is high, the pulse producing circuits 34 and 35 are switched or otherwise controlled to provide a greater negative going portion of the pulse (at $t_3$ or $t_4$ of FIG. 4) whereas if the rate is lower, the variable pulse circuits 34 and 35 are controlled to terminate the negative portion of the pulse at $t_1$ or $t_2$, whichever is appropriate.

Thus according to the present invention there is provided a means for incrementally detecting and recording accelerational force over a wide range of acceleration changes with great accuracy and sensitivity as is desired.

Further, for even higher rates, the described pulse-former compensation is extended by incrementing pulse counter 26 in a binary order higher than the lowest bit. This is accomplished during acceleration rates of extreme magnitude, not usually encountered. If encountered, this condition prevails for periods of time in the milliseconds. Therefore, the computational errors therein associated are very negligible.

What is claimed is:

1. In an accelerometer, an acceleration sensitive device reversibly movable in response to acceleration, a reversible counter, and means for transmitting constant, high frequency impulses thereto, pickoff means responsive to displacement of said device from a neutral position in one direction for connecting said constant frequency pulses to said counter for additive summation and responsive to displacement in the opposite direction for connecting said pulses to the counter for subtractive summation, a digital to analog converter for transforming the digital count in the counter to an analog signal, torque producing means responsive to said analog signal for restoring said acceleration sensitive device to its neutral position, means for stabilizing said accelerometer comprising a pulse generator responsive to each pulse additively entering said counter for producing an additive correcting pulses, a second single pulse generator responsive to each pulse subtractively entering said counter for producing a subtractive correcting pulse, and means coupling said additive correcting pulses and subtractive correcting pulses to said converter thereby to vary said analog signal.

2. In an incrementally operated digital accelerometer, an inertia element oppositely displaceable along an axis in response to acceleration, torque means for restoring the element to a neutral position upon each incremental change in acceleration, and means energizing the said torque means with an analog signal variable in incremental steps, said means including on-off pickoff means responsive to each incremental displacement of said inertia element and to the direction thereof along said axis, a source of rapidly recurring uniform pulses, a reversible counter, means responsive to said on-off pickoff means for additively directing pulses from said source to said counter for each displacement of said element in one direction and for subtractively directing said pulses to said counter for each displacement in the opposite direction, whereby for each displacement a differential increment is accumulated additively or subtractively in said counter, means for converting the digital differential quantity in said counter into said analog signal, means for correcting for the time lag in the digital accelerometer, said time lag correcting means including means for transiently varying said analog signal during each incremental increase in acceleration and transiently varying said analog signal during each incremental decrease in acceleration, said transiently increasing means including a pulse producer responsive during each incremental displacement of the inertia element in one direction to add an impulse into the converting means additively with said counter, and a second transient pulse producer responsive to each incremental displacement of the inertia element in the opposite direction to insert an impulse into the converting means subtractively with said reversible counter.

3. In an incremental accelerometer, a high speed pulse source, a reversible counter, an inertia element displaceable for a short distance in one direction in response to an increment of acceleration and displaceable in the opposite direction in response to an increment of acceleration in the opposite direction, pickoff means responsive to each said displacement in said one direction for coupling said source to said reversible counter to additively sum pulses and responsive to each said displacement in said opposite direction for coupling said source to said reversible counter to subtractively sum pulses, means translating the resulting differential of said pulses in said counter into an analog signal, means coupling said analog signal to return said inertia element to its initial position after each incremental displacement, and means for transiently varying said analog signal during each displacement of the inertia element in a direction to anticipate the incremental change of acceleration.

4. In an incremental accelerometer, a high speed source, a reversible counter, an inertia element displaceable for a short distance in one direction in response to an increment of acceleration and displaceable in the opposite direction in response to an increment of acceleration in the opposite direction, pickoff means responsive to each said displacement in said one direction for coupling said source to said reversible counter to additively sum pulses and responsive to each said displacement in said opposite direction for coupling said source to said reversible counter to subtractively sum pulses, means translating the resulting differential of said pulses in said counter into an analog signal, means coupling said analog signal to return said inertia element to its initial position after each incremental displacement, and means for transiently varying said analog signal during each displacement of the inertia element in a direction to anticipate the incremental change of acceleration, said transient varying means including means responsive to each pulse being additively summed by the reversible counter to transiently vary said analog signal, and being responsive to each pulse being subtractively summed by the counter to transiently vary said analog signal.

5. In an incremental accelerometer, a high speed pulse source, a reversible counter, an inertia element displaceable in one direction in response to an incremental change in acceleration and displaceable in the opposite direction in response to an incremental change of acceleration in the opposite direction, pickoff means responsive to each said displacement in one direction for coupling said source to said counter to subtractively transmit a pulse thereto thereby increasing the count in said reversible counter by one increment and responsive to each said displacement in the opposite direction for coupling said source to said mounter to subtractively transmit a pulse thereto thereby decreasing the differential count in said reversible counter by one increment, whereby at any given time the reversible counter reads an accumulated sum proportional to the differential acceleration, means continuously translating said accumulated sum into an analog signal, a restoring force generating means for returning said inertia element to its null position after each displacement thereof, and means for stabilizing said inertia element and restoring force generating means, said stabilizing means comprising means for transiently varying said restoring force means during each incremental increase and decrease thereof, said transient variation means operating first in a direction to enhance the change in the restoring force and thereafter in a direction to retard the change in the restoring force, and means responsive to the rate of change of said incrementally operated restoring force means to vary the magnitude of the transient retarding the direction of the incremental change.

6. In an incrementally operating accelerometer, an inertia element oppositely displaceable along an axis from a neutral position in response to acceleration in either direction, an incrementally operating restoring system for continuously returning said element to its neutral position, said restoring system including means for detecting the displacement of said element from its neutral position in either direction, torque means operating upon said inertia element to restore the element to its neutral position, a digitally operating system responsive to said detecting means for producing an incrementally varying signal continuously energizing said torque means; said digitally operating system having control means responsive during each incremental variation in the signal to produce a fixed waveform transient signal having a portion thereof of a polarity to first temporarily add to the incremental change in the signal, and a second portion thereof of a polarity to later temporarily subtract from the incremental change in the signal.

7. In the accelerometer of claim 6, said control means including a pulse producer energized after each displacement of said inertia element sensed by said detecting means for producing a constant waveform pulse of opposite polarities to first transiently aid and then transiently oppose the incremental change in the signal energizing said torque means.

8. In combination with the device of claim 7, means for varying said control means to change the waveform of said constant waveform pulse responsively to the rate-of-change of said incrementally operating restoring system.

9. In an incrementally opening digital accelerometer, an inertia element reversibly movable from a null position responsively to changes in acceleration, a digitally operating system for producing a restoring force to return said inertia element to its null position, said restoring force means being rapidly increasable and decreasable in discrete incremental steps responsively to displacement of said inertia element in opposite directions whereby the restoring force operating upon the inertia element at any time instant is comprised of an accumulation of discrete increments, and means for computing the velocity during any selected time interval, said means being responsive to the acceleration at the beginning of said selected time interval as determined by the accumulation of increments and being responsive to the change in acceleration during said time interval as determined by the differential of the incremental increases and decreases in said restoring means during said time interval, and means for stabilizing said inertia element and the restoring force generating means, comprising means for transiently varying said restoring force means during each incremental increase and decrease thereof, said transient variation means operating first in a direction to enhance the change in the restoring force and thereafter in a direction to retard the change of the restoring force, and means responsive to the rate of change of said incrementally operated restoring force means to vary the magnitude of the transient retarding the direction of incremental change.

10. In an incrementally operating digital accelerometer, an inertia element being reversibly displaceable in response to changes in acceleration, a restoring force generating means for returning said inertia element to its null position after each displacement thereof, said restoring force means being rapidly increasable and decreasable in discrete incremental steps responsively to the direction of the displacement of said inertia element, and means for stabilizing said inertia element and restoring force generating means, said stabilizing means comprising means for transiently varying said restoring force means during each incremental increase and decrease thereof, said transient variation means operating first in a direction to enhance the change in the restoring force and thereafter in a direction to retard the direction of change of the restoring force, and means responsive to the rate of change of said incrementally operating restoring force means to vary the magnitude of the transient retarding the direction of incremental change.

References Cited in the file of this patent

UNITED STATES PATENTS

| | | |
|---|---|---|
| 2,853,287 | Draper et al. | Sept. 23, 1958 |
| 2,916,279 | Stanton | Dec. 8, 1959 |
| 2,939,072 | Bell | May 31, 1960 |
| 2,943,493 | Ten Bosch et al. | July 5, 1960 |
| 2,988,737 | Schroeder | June 13, 1961 |